US008641283B2

(12) United States Patent
Oh et al.

(10) Patent No.: US 8,641,283 B2
(45) Date of Patent: Feb. 4, 2014

(54) HYDRODYNAMIC BEARING APPARATUS AND SPINDLE MOTOR HAVING THE SAME

(75) Inventors: Song Bon Oh, Gyunggi-do (KR); Jong Ryeol Oh, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/444,273

(22) Filed: Apr. 11, 2012

(65) Prior Publication Data

US 2013/0163902 A1 Jun. 27, 2013

(30) Foreign Application Priority Data

Dec. 26, 2011 (KR) .................. 10-2011-0142687

(51) Int. Cl.
*F16C 32/06* (2006.01)
*F16C 33/10* (2006.01)
*F16C 17/02* (2006.01)

(52) U.S. Cl.
CPC ............. *F16C 33/107* (2013.01); *F16C 17/026* (2013.01)
USPC ............................ 384/114; 384/100; 384/113

(58) Field of Classification Search
CPC .................................. F16C 33/107; F16C 17/026
USPC ................... 384/100, 107, 112–115, 120, 123
See application file for complete search history.

(56) References Cited

U.S. PATENT DOCUMENTS

| 3,238,000 | A | * | 3/1966 | Rinia et al. ............... 384/398 |
| 3,467,449 | A | * | 9/1969 | Muijderman .............. 384/110 |
| 3,764,186 | A | * | 10/1973 | Laing et al. ............... 384/108 |
| 6,554,474 | B2 | * | 4/2003 | Saito et al. ................ 384/107 |
| 6,702,464 | B1 | * | 3/2004 | Takeuchi et al. ........... 384/107 |
| 6,877,902 | B2 | * | 4/2005 | Ikegawa .................... 384/114 |
| 7,513,688 | B2 | * | 4/2009 | Uenosono et al. .......... 384/100 |
| 2002/0134683 | A1 | * | 9/2002 | Steele ....................... 204/640 |
| 2003/0117906 | A1 | * | 6/2003 | Rahman .................... 369/13.35 |
| 2005/0152782 | A1 | * | 7/2005 | Shishido ................... 415/220 |
| 2007/0071378 | A1 | | 3/2007 | Haga et al. |
| 2008/0036302 | A1 | | 2/2008 | Kim et al. |
| 2008/0155829 | A1 | * | 7/2008 | Hou ......................... 29/898.02 |
| 2008/0168654 | A1 | * | 7/2008 | Hou ......................... 384/123 |
| 2009/0074336 | A1 | | 3/2009 | Engesser et al. |

FOREIGN PATENT DOCUMENTS

| JP | 2001-140858 | 5/2001 |
| JP | 2001-339905 | 12/2001 |
| JP | 2002-061650 | 2/2002 |
| JP | 2002-181035 | 6/2002 |
| JP | 2004-270820 | 9/2004 |
| JP | 2007-92799 | 4/2007 |

(Continued)

OTHER PUBLICATIONS

Korean Office Action issued Apr. 27, 2013 in corresponding Korean Patent Application No. 10-2011-0142687.

(Continued)

*Primary Examiner* — Marcus Charles

(57) ABSTRACT

There is provided a hydrodynamic bearing apparatus, including: a shaft; and a sleeve rotatably supporting the shaft, wherein at least one of an outer surface of the shaft and an inner surface of the sleeve includes upper and lower hydrodynamic grooves generating hydrodynamic fluid pressure while the shaft rotates, and at least one of the upper and lower hydrodynamic grooves has a depth of a lower part thereof greater than that of an upper part thereof.

6 Claims, 4 Drawing Sheets

(56) References Cited

FOREIGN PATENT DOCUMENTS

| JP | 2009-68710 | 4/2009 |
| JP | 2010-131732 | 6/2010 |
| JP | 2010-226955 | 10/2010 |

OTHER PUBLICATIONS

Japanese Office Action issued Sep. 10, 2013 in corresponding Japanese Patent Application No. 2012-089986.

* cited by examiner 3-3'

4-4`

HYDRODYNAMIC BEARING APPARATUS AND SPINDLE MOTOR HAVING THE SAME

CROSS-REFERENCE TO RELATED APPLICATIONS

This application claims the priority of Korean Patent Application No. 10-2011-0142687 filed on Dec. 26, 2011, in the Korean Intellectual Property Office, the disclosure of which is incorporated herein by reference.

BACKGROUND OF THE INVENTION

1. Field of the Invention

The present invention relates to a hydrodynamic bearing apparatus and a spindle motor having the same.

2. Description of the Related Art

In general, a hydrodynamic bearing apparatus is provided in a small-sized spindle motor used in a recording disk driving device (hard disk drive, HDD) and a lubricating fluid such as oil is filled in a bearing clearance formed between a shaft and a sleeve provided in the hydrodynamic bearing apparatus. Hydrodynamic fluid pressure is formed while the oil filled in the bearing clearance is pumped to rotatably support the shaft.

That is, in general, in the hydrodynamic bearing apparatus, hydrodynamic fluid pressure is generated through a thrust hydrodynamic groove having a spiral shape or a journal hydrodynamic groove having a herringbone shape to achieve stability in motor rotation.

Further, the journal hydrodynamic groove for generating hydrodynamic fluid pressure in a radial direction may be formed in plural as two sets of journal hydrodynamic grooves on the internal surface of the sleeve.

Meanwhile, recent years have seen technological goals of reducing vibrations generated when the spindle motor is driven as well as an increase in the capacity of the recording disk driving device. That is, improvements in the performance of the hydrodynamic bearing apparatus provided in the spindle motor are required in order to drive the recording disk driving device without errors caused by the vibrations generated when the spindle motor is driven.

To this end, the vibrations generated while the motor is driven need to be reduced by extending a gap between the journal hydrodynamic grooves having the herringbone pattern (that is, increasing the length of a bearing span).

However, in order to prevent the lubricating fluid from being dispersed to the outside of the hydrodynamic bearing apparatus, and further, in order to prevent negative pressure from being generated from the inside of the hydrodynamic bearing apparatus, upper and lower parts may be asymmetrical, based on a maximum pressure area.

In addition, in order to allow the lubricating fluid to flow to the lower part of the sleeve in the end, the upper and lower parts are relatively further asymmetric to each other based on a maximum pressure generation area.

As a result, the span length is reduced.

Therefore, the development of the structure of the hydrodynamic bearing apparatus that can reduce the generation of the negative pressure, suppress the dispersion of the lubricating fluid, and increase the span length is required.

SUMMARY OF THE INVENTION

Aspects of the present invention provide a hydrodynamic bearing apparatus capable of improving a rotary characteristic and a spindle motor having the same.

According to an aspect of the present invention, there is provided a hydrodynamic bearing apparatus, including: a shaft; and a sleeve rotatably supporting the shaft, at least one of an outer surface of the shaft and an inner surface of the sleeve including upper and lower hydrodynamic grooves generating hydrodynamic fluid pressure while the shaft rotates, and at least one of the upper and lower hydrodynamic grooves having a depth of a lower part thereof greater than that of an upper part thereof.

The upper and lower hydrodynamic grooves may have a herringbone shape, and longitudinal lengths of the upper part and the lower part of at least one of the upper and lower hydrodynamic grooves may be equal.

The depth of the upper part of at least one of the upper and lower hydrodynamic grooves may increase toward a center line thereof.

The depth of the lower part of the upper and lower hydrodynamic grooves may be uniform toward the edge from the center line.

The longitudinal length of the upper hydrodynamic groove may be greater than that of the lower hydrodynamic groove.

The hydrodynamic bearing apparatus may further include a cover member installed on the bottom of the sleeve to prevent a lubricating fluid from leaking.

According to another aspect of the present invention, there is provided a spindle motor, including: a shaft; a sleeve rotatably supporting the shaft; a base member fixedly installed in the sleeve; and a rotor hub fixedly installed on the top of the shaft to rotate in association with the shaft, at least one of an outer surface of the shaft and an inner surface of the sleeve including upper and lower hydrodynamic grooves generating hydrodynamic fluid pressure while the shaft rotates, and at least one of the upper and lower hydrodynamic grooves having the depth of a lower part thereof greater than that of an upper part thereof.

The upper and lower hydrodynamic grooves may have a herringbone shape, longitudinal lengths of the upper part and the lower part of at least one of the upper and lower hydrodynamic grooves may be equal, and the depth of the upper part may increase toward a center line thereof.

The depth of the lower part of the upper and lower hydrodynamic grooves may be uniform toward the edge from the center line.

The longitudinal length of the upper hydrodynamic groove may be greater than that of the lower hydrodynamic groove.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, when it is determined that the detailed description of the known art related to the present invention may obscure the gist of the present invention, the detailed description thereof will be omitted.

Figure 1:
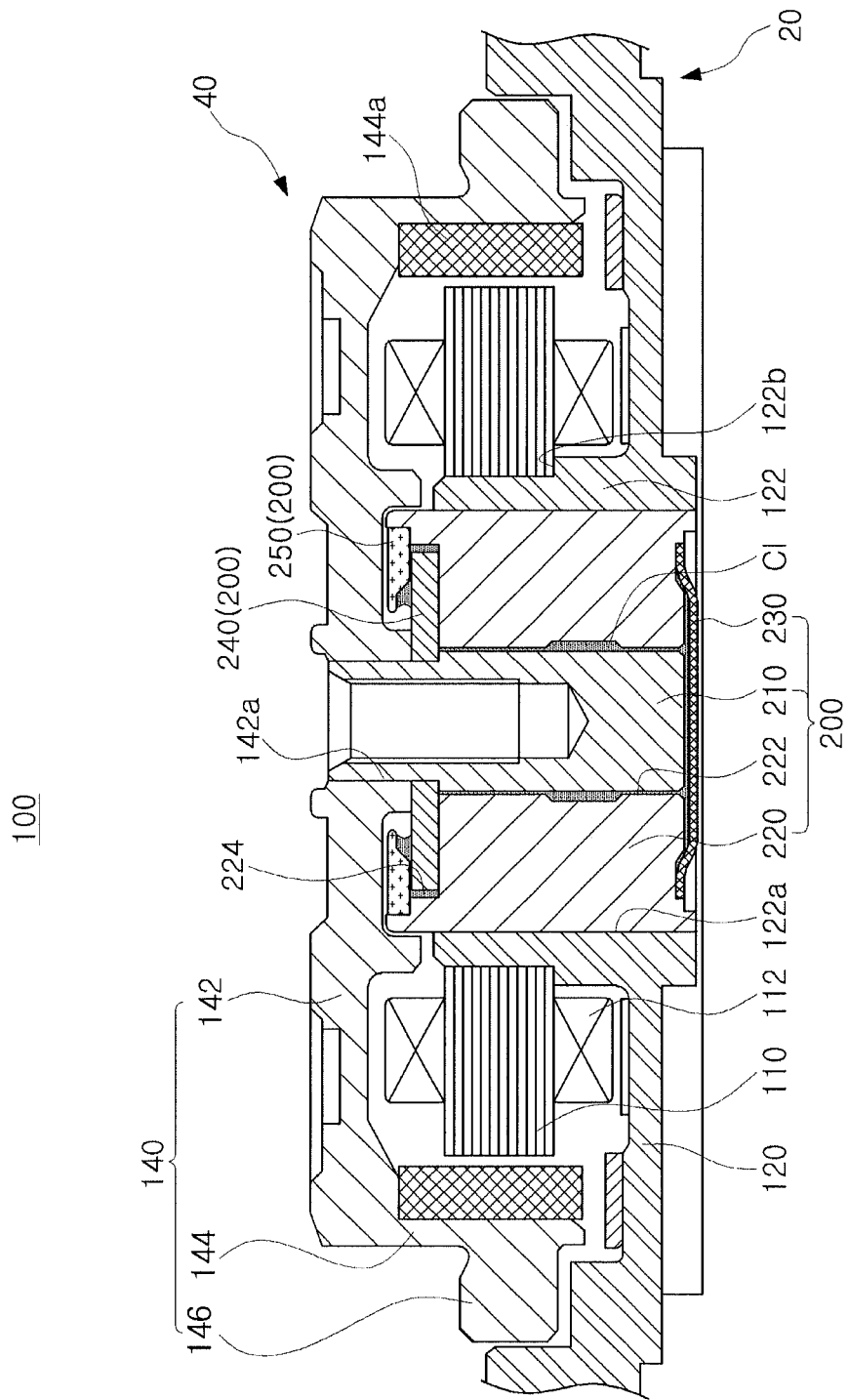
FIG. 1 is a schematic cross-sectional view showing a spindle motor having a hydrodynamic bearing apparatus according to an embodiment of the present invention.
Figure 2:
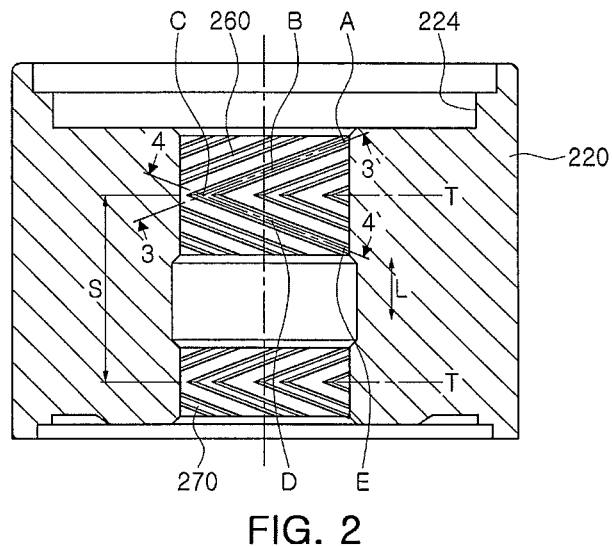
FIG. 2 is a cross-sectional view showing a sleeve provided in the hydrodynamic bearing apparatus according to the embodiment of the present invention.
Figure 3:
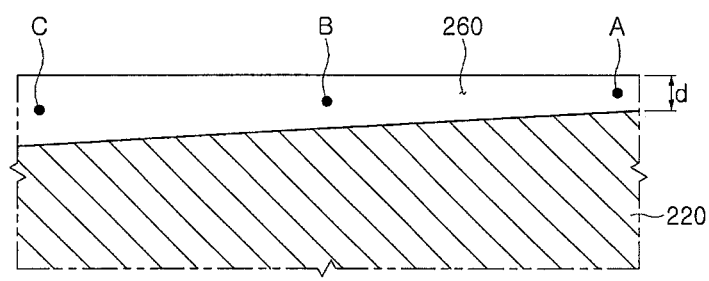
FIG. 3 is a cross-sectional view taken along line 3-3' of FIG. 2.
Figure 4:
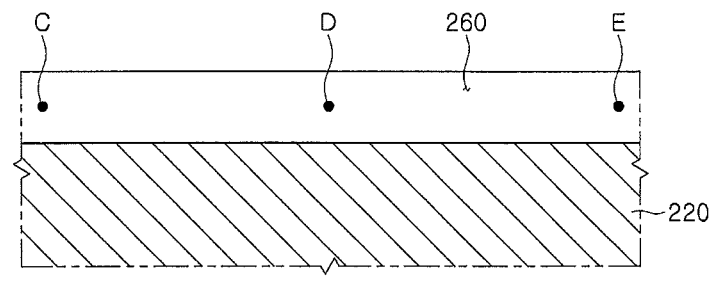
FIG. 4 is a cross-sectional view taken along line line 4-4' of FIG. 2.

FIG. 1 is a schematic cross-sectional view showing a spindle motor with a hydrodynamic bearing apparatus according to an embodiment of the present invention. FIG. 2 is a cross-sectional view showing a sleeve provided in the hydrodynamic bearing apparatus according to the embodiment of the present invention. FIG. 3 is a cross-sectional view taken along line 3-3' of FIG. 2. FIG. 4 is a cross-sectional view taken along line 4-4' of FIG. 2.

Referring to FIGS. 1 through 4, the spindle motor 100 according to an embodiment of the present invention may include a base member 120, a hydrodynamic bearing apparatus 200, and a rotor hub 140.

In addition, the hydrodynamic bearing apparatus 200 according to the embodiment of the present invention may include a shaft 210, a sleeve 220, a cover member 230, a thrust plate 240, and a cap member 250.

Meanwhile, the spindle motor 100 may be a motor adopted in a recording disk driving device driving a recording disk.

Terms regarding directions will be first defined. As viewed in FIG. 1, an axial direction refers to a vertical direction, i.e., a direction from a lower part of the shaft 210 toward an upper part thereof or a direction from the upper part of the shaft 210 toward the lower part thereof, and a radial direction refers to a horizontal direction, i.e., a direction from an outer surface of the rotor hub 140 toward the shaft 210 or a direction from the shaft 210 toward the outer surface of the rotor hub 140.

Further, a circumferential direction refers to a rotation direction along the outer surfaces of the rotor hub 140 and the shaft 210.

In addition, the spindle motor 100 according to the embodiment of the present invention may largely include a stator 20 and a rotor 40. The stator 20 may represent all fixed members rotatably supporting the rotor 40 and the rotor 40 may represent a rotating member supported by the stator 20 to rotate.

The base member 120, a fixed member rotatably supporting the rotor 40, may constitute the stator 20. In addition, the base member 120 may include an installation section 122 in which the sleeve 220 is fixedly installed.

The installation section 122 may protrude upwardly in an axial direction and may have an installation hole 122a through which the sleeve 220 may be inserted. That is, the sleeve 220 may be fixedly installed in the installation section 122.

Meanwhile, a step portion 122b may be formed on an outer surface of the installation section 122 such that the stator core 110 may be inserted and fixed thereto. That is, the stator core 110 may be fixedly installed in the installation section 122 to be seated on the step portion 122b formed on the outer surface of the installation section 122.

The hydrodynamic bearing apparatus 200 may generate hydrodynamic fluid pressure by pumping a lubricating fluid filled while the shaft 210 rotates. The hydrodynamic bearing apparatus 200 will be described in detail below.

The rotor hub 140 may fixedly installed on the shaft 210 to thus rotate. That is, the rotor hub 140, a rotating member, rotating in association with the shaft 210, may constitute the rotor 40 and may be fixedly installed on the top of the shaft 210.

Meanwhile, the rotor hub 140 may include a disk-shaped body 142 having amounting hole 142a therein through which the shaft 210 is inserted, a magnet installation section 144 extending downwardly in an axial direction from an edge of the body 142, and a disk seating section 146 extending outwardly in a radial direction from the end of the magnet installation section 144.

That is, the rotor hub 140 may have a cup shape and form an internal space together with the base member 120. In addition, the stator core 110 may be disposed in the internal space formed by the rotor hub 140 and the base member 120.

Further, a driving magnet 144a may be fixedly installed in the magnet installation section 144. That is, the driving magnet 144a may be fixedly installed on an inner peripheral surface of the magnet installation section 144 such that the driving magnet 144a may be placed to be opposite to a front end of the stator core 110.

In addition, the driving magnet 144a may have a circular ring shape and may be a permanent magnet that generates a predetermined intensity of magnetic force by an N pole and an S pole alternately magnetized in a circumference direction. That is, the driving magnet 144a may serve to generate driving force for rotatably driving the rotor hub 140.

In other words, when power is applied to a coil 112 wound around the stator core 110, force to rotatably drive the rotor hub 140 may be generated by an electromagnetic interaction between the stator core 110 having the coil 112 wound therearound and the driving magnet 144a. As a result, the rotor hub 140 may be rotatably driven.

Consequently, the shaft 210 and the thrust plate 240 fixedly installed on the shaft 210 may rotate in association with the rotor hub 140 at the time of rotation of the rotor hub 140.

As such, when the rotor hub 140 rotates, the lubricating fluid filled in the hydrodynamic bearing apparatus 200 may be pumped to generate the hydrodynamic fluid pressure.

Hereinafter, the hydrodynamic bearing apparatus 200 will be described in more detail.

The shaft 210 may be a rotating member constituting the rotor 40 that is rotatably supported by the stator 20. That is, the shaft 210 may be rotatably supported by the sleeve 220.

In addition, the sleeve 220 is a fixed member that constitutes the stator 20 together with the base member 120 and rotatably supports the rotor 40.

In addition, the sleeve 220 may be fixedly installed in the installation section 122 as described above. In addition, a through-hole 222 is formed at the center of the sleeve 220 and the shaft 210 is inserted into the through-hole 222 to be rotatably supported by the sleeve 220.

Meanwhile, when the shaft 210 is inserted and installed in the through-hole 222, the outer surface of the shaft 210 and the inner surface of the sleeve 220 are spaced apart from each other by a predetermined distance to form a bearing clearance C1.

Further, the lubricating fluid may be filled in the bearing clearance C1 such that the hydrodynamic fluid pressure may be generated while the shaft 210 rotates.

In addition, upper and lower hydrodynamic grooves 260 and 270 for generating the hydrodynamic fluid pressure while the shaft 210 rotates maybe formed on at least one of the outer surface of the shaft 210 and the inner surface of the sleeve 220.

In addition, in at least one of the upper and lower hydrodynamic grooves 260 and 270, the depth of a lower part thereof may be greater than that of an upper part thereof.

Furthermore, the upper and lower hydrodynamic grooves 260 and 270 may have a herringbone shape.

Herein, as viewed in FIGS. 2, 3 and 4, terms regarding a longitudinal direction and the depth used to describe the upper and lower hydrodynamic grooves 260 and 270 will be first described. The longitudinal directions of the upper and lower hydrodynamic grooves 260 and 270 refer to an L direction (that is, axial direction) which is the vertical direction in FIG. 2, and the depths refer to d shown in FIGS. 3 and 4.

The upper and lower hydrodynamic grooves 260 and 270 will be described in more detail. However, since the upper and lower hydrodynamic grooves 260 and 270 have the same configuration except for different sizes therebetween, a description of the lower hydrodynamic groove 270 will be substituted by a description of the upper hydrodynamic groove 260.

The upper hydrodynamic groove 260 may have a herringbone shape in which it is bent at a center line T. In addition, the upper part of the upper hydrodynamic groove 260 may represent a part provided in an upper portion thereof, based on the center line T, and the lower part of the upper hydrodynamic groove 260 may represent a part provided in a lower portion thereof, based on the center line T.

Further, the upper hydrodynamic groove 260 may be formed with the longitudinal directions of the upper part and the lower part being equal. That is, the upper hydrodynamic groove 260 may have a vertically symmetric shape based on the center line T.

In addition, in the upper hydrodynamic groove 260, the depth of the lower part thereof maybe greater than that of the upper part thereof. More specifically, the upper part of the upper hydrodynamic groove 260 may be formed to have the depth thereof increasing toward the center line T from the edge thereof. That is, the upper part of the upper hydrodynamic groove 260 may be inclined with the depth (d, see FIG. 3) thereof increasing toward point C from point A of FIG. 2.

In addition, the lower part of the upper hydrodynamic groove 260 may be formed with the depth thereof being uniform toward the edge thereof from the center line T. That is, the depth (d, see FIG. 4) of the lower part thereof maybe uniform, namely, from point C up to point E as shown in FIG. 2.

As such, since the depth of the lower part of the upper hydrodynamic groove 260 is greater than that of the upper part thereof, the upper hydrodynamic groove 260 may have a vertically symmetric shape based on the center line T.

Furthermore, since the depth of the lower part of the upper hydrodynamic groove 260 is greater than the that of the upper part, generation of negative pressure between the upper and lower hydrodynamic grooves 260 and 270 may be suppressed. Herein, the negative pressure may represent pressure lower than atmospheric pressure.

Moreover, the lubricating fluid may flow downwardly in an axial direction by the upper hydrodynamic groove 260 while the shaft 210 rotates.

Meanwhile, the lower hydrodynamic groove 270 has the same configuration as the upper hydrodynamic groove 260 except that the lower hydrodynamic groove 270 has a longitudinal length shorter than that of the upper hydrodynamic groove 260.

Therefore, a detailed description of the lower hydrodynamic groove 270 will be omitted.

As such, since the upper and lower hydrodynamic grooves 260 and 270 have the symmetric shape based on the center line T, a span length S may increase.

Herein, the span length S may represent a distance between an area where a maximum hydrodynamic pressure is generated while the lubricating fluid is pumped by the upper hydrodynamic groove 260 and an area where a maximum hydrodynamic pressure is generated while the lubricating fluid is pumped by the lower hydrodynamic groove 270.

That is, in the present embodiment, a distance between the center lines T of the upper and lower hydrodynamic grooves 260 and 270 may be the span length S.

As such, the span length S of the hydrodynamic bearing apparatus 200 according to the embodiment of the present invention may increase as compared with a case in which the upper and lower hydrodynamic grooves 260 and 270 do not have a symmetric shape based on the center line T.

Consequently, a rotary characteristic of the shaft 210 may be improved due to the increase of the span length S.

Meanwhile, in the present embodiment, both the upper and lower hydrodynamic grooves 260 and 270 may be symmetric to each other based on the center line T, and in the upper and lower hydrodynamic grooves 260 and 270, the depth of the lower part thereof is greater than that of the upper part thereof, but the present invention is not limited thereto.

Figure 5:
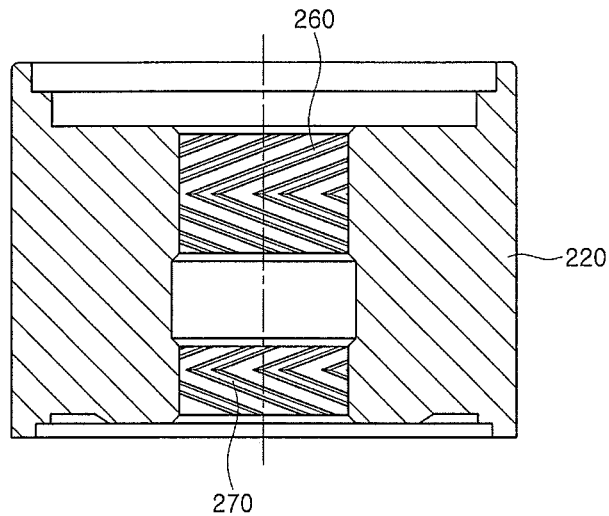
FIG. 5 is a front view showing a modified example of upper and lower hydrodynamic grooves according to the embodiment of the present invention.
Figure 6:
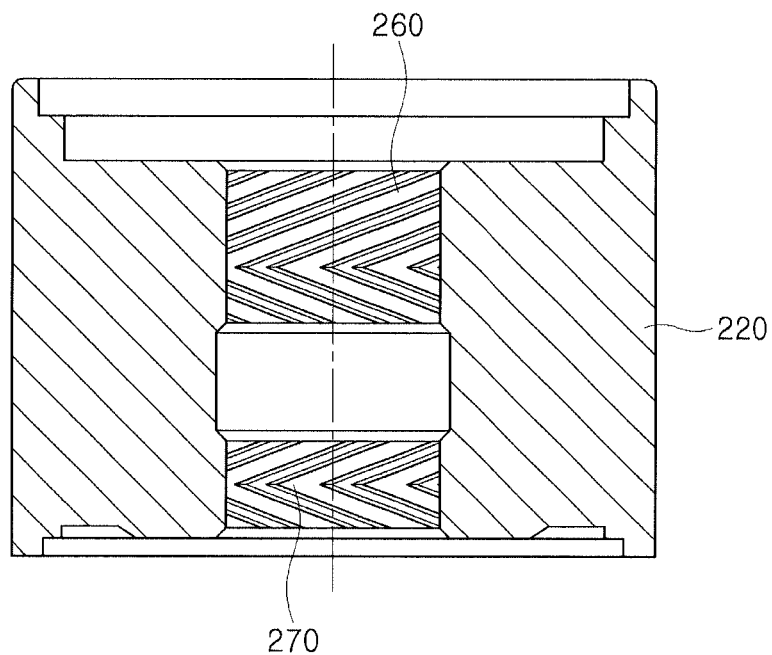
FIG. 6 is a front view showing another modified example of upper and lower hydrodynamic grooves according to the embodiment of the present invention.

That is, as shown in FIGS. 5 and 6, only any one of the upper and lower hydrodynamic grooves 260 and 270 may be configured to have a symmetric shape based on the center line T.

Further, in only one of the upper and lower hydrodynamic grooves 260 and 270, the depth of the lower part thereof may be greater than that of the upper part thereof. In other words, the hydrodynamic groove may be formed with a depth thereof increasing toward the center line T from the edge of the upper part.

The cover member 230 may be installed on the bottom of the sleeve 220 to serve to prevent the filled lubricating fluid from leaking to the lower side of the sleeve 220.

In addition, when the cover member 230 is installed on the sleeve 220, the lubricating fluid may be also filled in a space formed by the cover member 230 and the sleeve 220. Further, when the shaft 210 is installed in the sleeve 220, the bottom of the shaft 210 may contact the top of the cover member 230.

In addition, when the shaft 210 rotates, the lubricating fluid may flow into the space formed by the sleeve 220 and the cover member 230, and as a result, the shaft 210 may be lifted to a predetermined height.

The thrust plate 240 may be fixedly installed on the shaft 210 to be placed below the rotor hub 140. As a result, the thrust plate 240 may rotate in association with the shaft 210. That is, the thrust plate 240 may be a rotating member that constitutes the rotor 40 together with the shaft 210.

In addition, when the shaft 210 is installed in the sleeve 220, the thrust plate 240 may be inserted and placed in an insertion groove 224 of the sleeve 220.

Further, a thrust hydrodynamic groove (not shown) for generating thrust hydrodynamic fluid pressure while the thrust plate 240 rotates may be formed in at least one of the bottom of the thrust plate 240 and the bottom of the insertion groove 224.

The cap member 250 may be fixedly installed in the sleeve 220 to be placed above the thrust plate 240. In other words, the cap member 250 may be a fixed member, constitution the stator 20 together with the sleeve 220.

Further, an interface between the lubricating fluid and air may be formed by the bottom of the cap member 250 and a top surface of the thrust plate 240. To this end, an inclination surface may be formed at the end of the bottom of the cap member 250.

That is, the lubricating fluid filled in the bearing clearance may form the interface with air in a space formed by the bottom of the cap member 250 and the top of the thrust plate 240 by a capillary phenomenon.

As described above, the span length S of the hydrodynamic bearing apparatus 200 may increase as compared with a case in which the upper and lower hydrodynamic grooves 260 and 270 do not have a symmetric shape based on the center line T.

As a result, the rotary characteristic of the shaft 210 may be improved due to the increase of the span length S.

Furthermore, since the depth of the lower part of the upper hydrodynamic groove 260 is greater than the that of the upper part thereof, the generation of negative pressure between the upper and lower hydrodynamic grooves 260 and 270 may be suppressed.

That is, the upper hydrodynamic groove 260 may be inclined to have the depth (d, see FIG. 3) increasing toward point C from point A of FIG. 2 and the depth (d, see FIG. 4) being uniform up to point E from point C of FIG. 2, and as a result, the generation of the negative pressure between the upper and lower hydrodynamic grooves 260 and 270 may be suppressed. Furthermore, the lubricating fluid may be prevented from being dispersed.

As set forth above, according to an embodiment of the present invention, an upper part and a lower part may be formed to have a symmetric shape based on a center line through upper and lower hydrodynamic grooves of which the depth of the lower part is greater than the depth of the upper part thereof to thereby increase a span length.

Further, a rotary characteristic may be improved by suppressing generation of negative pressure.

While the present invention has been shown and described in connection with the embodiments, it will be apparent to those skilled in the art that modifications and variations may be made without departing from the spirit and scope of the invention as defined by the appended claims.

What is claimed is:

1. A hydrodynamic bearing apparatus, comprising:
a shaft; and
a sleeve rotatably supporting the shaft,
at least one of an outer surface of the shaft and an inner surface of the sleeve including upper and lower hydrodynamic grooves generating hydrodynamic fluid pressure while the shaft rotates,
at least one of the upper and lower hydrodynamic grooves having a depth of a lower part thereof greater than that of an upper part thereof,
the depth of the upper part of at least one of the upper and lower hydrodynamic grooves increases toward a center line thereof, and
the depth of the lower part of the upper and lower hydrodynamic grooves is uniform toward the edge from the center line.

2. The hydrodynamic bearing apparatus of claim 1, wherein the upper and lower hydrodynamic grooves have a herringbone shape, and longitudinal lengths of the upper part and the lower part of at least one of the upper and lower hydrodynamic grooves are equal.

3. The hydrodynamic bearing apparatus of claim 1, wherein the longitudinal length of the upper hydrodynamic groove is greater than that of the lower hydrodynamic groove.

4. The hydrodynamic bearing apparatus of claim 1, further comprising a cover member installed on the bottom of the sleeve to prevent a lubricating fluid from leaking.

5. A spindle motor, comprising:
a shaft;
a sleeve rotatably supporting the shaft;
a base member fixedly installed in the sleeve; and
a rotor hub fixedly installed on the top of the shaft to rotate in association with the shaft,
at least one of an outer surface of the shaft and an inner surface of the sleeve including upper and lower hydrodynamic grooves generating hydrodynamic fluid pressure while the shaft rotates,
at least one of the upper and lower hydrodynamic grooves having the depth of a lower part thereof greater than that of an upper part thereof,
the upper and lower hydrodynamic grooves have a herringbone shape, and longitudinal lengths of the upper part and the lower part of at least one of the upper and lower hydrodynamic grooves are equal and a depth of the upper part increases toward a center line thereof, and
the depth of the lower part of the upper and lower hydrodynamic grooves is uniform toward the edge from the center line.

6. The spindle motor of claim 5, wherein the longitudinal length of the upper hydrodynamic groove is greater than that of the lower hydrodynamic groove.

* * * * *